United States Patent
Wall et al.

(10) Patent No.: US 10,570,758 B1
(45) Date of Patent: Feb. 25, 2020

(54) GEARED TURBOFAN AERO GAS TURBINE ENGINE WITH SOLID BORE TURBINE DISK

(71) Applicant: Florida Turbine Technologies, Inc., Jupiter, FL (US)

(72) Inventors: Andrew P Wall, Orlando, FL (US); Edwin L Kite, Stuart, FL (US); Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 98 days.

(21) Appl. No.: 15/983,503

(22) Filed: May 18, 2018

(51) Int. Cl.
| | | |
|---|---|---|
| *F01D 5/02* | (2006.01) | |
| *F01D 5/34* | (2006.01) | |
| *F01D 25/16* | (2006.01) | |
| *F02K 3/06* | (2006.01) | |
| *F01D 5/06* | (2006.01) | |
| *F02C 7/36* | (2006.01) | |

(52) U.S. Cl.
CPC ............. *F01D 5/34* (2013.01); *F01D 25/162* (2013.01); *F02K 3/06* (2013.01); *F01D 5/025* (2013.01); *F01D 5/026* (2013.01); *F01D 5/066* (2013.01); *F02C 7/36* (2013.01); *F05D 2220/323* (2013.01)

(58) Field of Classification Search
CPC . F01D 5/34; F01D 5/066; F01D 5/025; F01D 5/026; F01D 25/162; F02C 7/36; F02K 3/06
See application file for complete search history.

(56) References Cited

U.S. PATENT DOCUMENTS

| | | | | |
|---|---|---|---|---|
| 1,399,816 A | * | 12/1921 | Spiess | F01D 5/066 416/248 |
| 2,414,788 A | * | 1/1947 | Altorfer | F01D 25/125 415/138 |
| 3,704,075 A | * | 11/1972 | Karstensen | F01D 9/041 415/68 |
| 3,914,067 A | * | 10/1975 | Leto | F01D 5/026 416/244 R |
| 4,643,648 A | * | 2/1987 | Huller | B22F 3/1216 416/241 B |
| 5,537,814 A | * | 7/1996 | Nastuk | F01D 5/066 60/796 |
| 6,203,274 B1 | * | 3/2001 | Kikuchi | F01D 5/02 415/191 |
| 6,499,969 B1 | * | 12/2002 | Tombers | F01D 5/025 416/204 A |
| 6,896,479 B2 | * | 5/2005 | Svihla | F01D 5/026 415/104 |
| 8,944,761 B2 | * | 2/2015 | Farineau | F01D 5/026 415/216.1 |
| 2016/0376889 A1 | * | 12/2016 | Rawe | F01D 5/066 416/198 A |

* cited by examiner

*Primary Examiner* — Dwayne J White
*Assistant Examiner* — Behnoush Haghighian
(74) *Attorney, Agent, or Firm* — Christopher & Weisberg, P.A.

(57) ABSTRACT

An aero gas turbine engine with a last stage turbine disc of a solid bore design. The solid bore turbine disc includes a center tie bolt that attaches to an upstream face of the solid bore disc. The attachment location is under the bore of the upstream stage. The aft side of the solid disc creates a stub shaft upon which a bearing is directly mounted. No fasteners pass through the solid bore disc. Omission of outboard fasteners allow for ease of assembly, reduced cost, reduced weight, and a reduced part count.

5 Claims, 1 Drawing Sheet

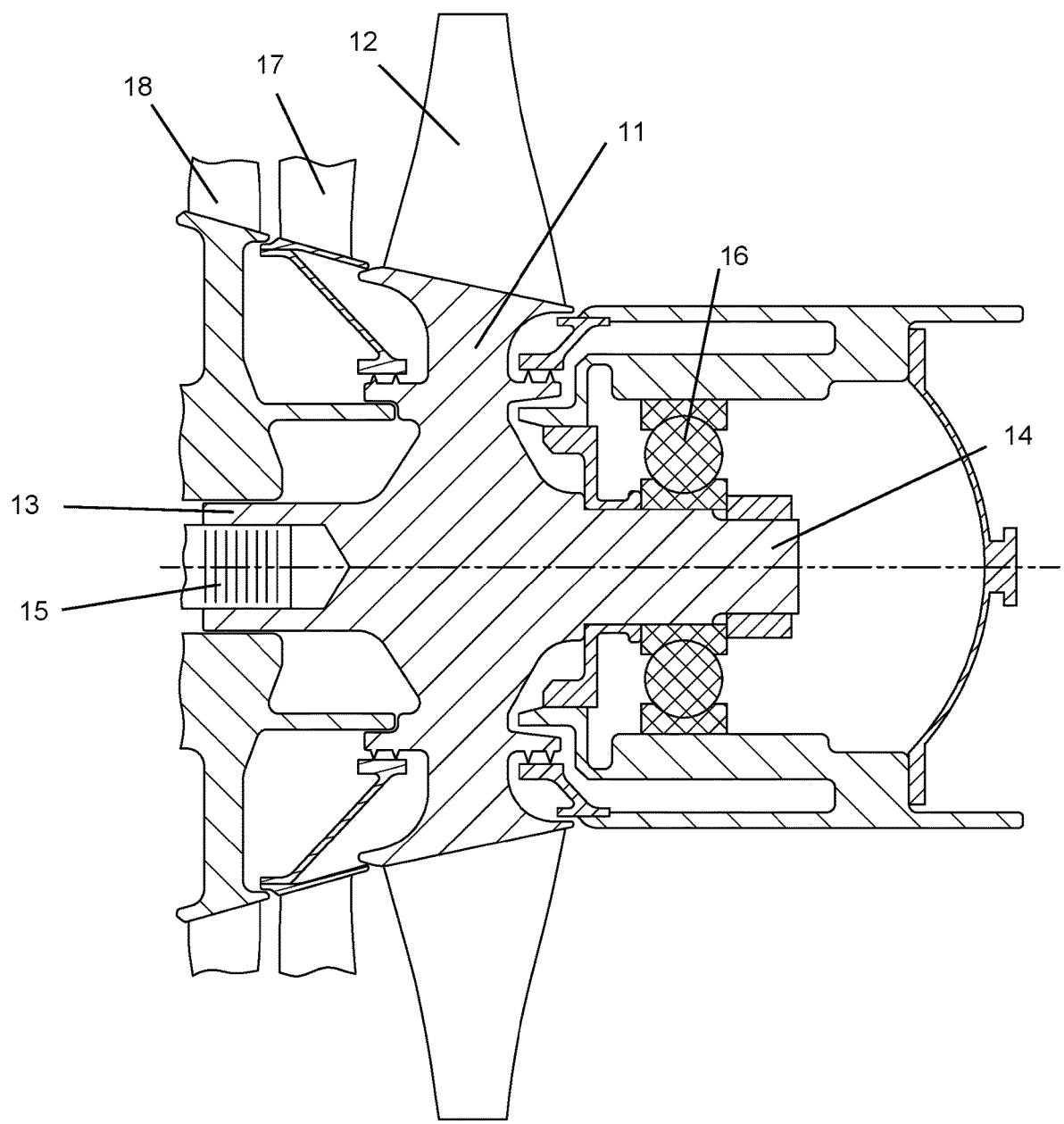

GEARED TURBOFAN AERO GAS TURBINE ENGINE WITH SOLID BORE TURBINE DISK

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to a geared turbofan aero gas turbine engine with a solid bore turbine disk.

Description of the Related Art Including Information Disclosed Under 37 CFR 1.97 and 1.98

In a gas turbine engine, a gas turbine drives a compressor to deliver compressed air to a combustor to produce a hot gas stream that then drives the gas turbine. In an aero gas turbine engine, the gas turbine also drives a fan that produces both a core air flow and a bypass air flow. The core air flow is delivered to the combustor while the bypass flow propels the aircraft. The fan is typically connected directly to the engine spool and thus operates at the same rotational speed as the gas turbine.

In a twin spool aero gas turbine engine, a low spool includes the fan and the low pressure compressor and low pressure gas turbine on the same spool. The high spool includes the high pressure compressor and high pressure gas turbine. Compressed air from the low pressure compressor is delivered to the high pressure compressor. The fan operates at the same rotational speed as the low spool.

A recent development in aero gas turbine engines with twin spools is the use of a geared turbofan design. In this design, the fan is driven by the low spool through a speed reduction gear box so that the fan can operate at a lower speed than the low spool. The geared turbofan design permits an aft turbine stage to operate at a higher speed. This higher speed also increases the stage aerodynamic efficiency at the cost of increased mechanical stress in the airfoils and the disc from high $AN^2$.

A solid bore disc offers a method of managing disc stresses. Axial clamping function, which would otherwise be achieved using a center tie bolt, is achieved by using multiple fasteners (bolt circle) that pass through the disc in an outboard region that is isolated from high tangential hoop stresses in the bore. A disc with holes produces high stresses within the disc.

BRIEF SUMMARY OF THE INVENTION

An aero gas turbine engine with a last stage turbine disc of a solid bore design. The solid bore turbine disc includes a center tie bolt that attaches to an upstream face of the solid bore disc. The attachment location is under the bore of the upstream stage. The aft side of the solid disc creates a stub shaft upon which a bearing is directly mounted. No fasteners pass through the solid bore disc. Omission of outboard fasteners allow for ease of assembly, reduced cost, reduced weight, and a reduced part count.

BRIEF DESCRIPTION OF THE SEVERAL VIEWS OF THE DRAWINGS

FIG. 1 shows a cross section view of the solid bore disc used in an aero gas turbine engine of the present invention.

DETAILED DESCRIPTION OF THE INVENTION

The present invention is a geared turbofan aero gas turbine engine with a last stage turbine disc having a solid bore design that reduces disc stress and allow for a higher $AN^2$ design. The geared turbofan engine that uses the solid disc bore in the aft stage of the turbine includes a high spool with a high pressure turbine driving a high pressure compressor, and a fan stage driven by the high spool through a speed reduction gear box. A flexible coupling is used between the high spool and the fan. The flexible coupling includes an inner shaft within an outer shaft where the only contact between the two shafts is in the connection between the two shafts which is on the aft end of the inner shaft. The inner shaft is relatively thin in order to allow for flexibility. The outer shaft is relatively thick in order to support the high pressure compressor which includes multiple axial stages of rotor blades and a centrifugal compressor downstream thereof. In this geared turbofan design, no low pressure turbine is used.

The geared turbofan engine in which a long L/D flexible shaft is used to connect a sun gear to the high speed shaft in order to tolerate misalignment. In order to reduce the overall system length, a smaller diameter flexible shaft is contained within but not in contact with a larger diameter primary turbomachinery shaft such that the smaller flexible shaft adjoins to the primary shaft aft of the primary shaft bearing. This design reduces a length of the overall system and reduces additional cost associated with a flex bellows or spline.

FIG. 1 shows the solid bore disc used in the aft stage of the gas turbine in the geared turbofan engine of the present invention. The solid bore disc 11 includes a row of rotor blades 12 with a forward or upstream side having a threaded bore 13 and an aft or downstream side having a solid axial extension 14. A center tie bolt 15 is secured to the threaded bore 13 which is connected to the high pressure compressor assembly of the engine. The high spool of the engine is rotatably supported by a forward bearing on a forward end of the spool and an aft bearing 16 on an aft end of the high spool as seen in FIG. 1. The high pressure turbine includes multiple stages with an upstream rotor blade 18 and stator vane 17. In the solid bore disc 11, no fasteners pass through the disc and thus no axial holes are used in the solid bore disc 11. Omission of outboard fasteners allows for ease of assembly, reduced cost, reduced weight, and a reduced part count. Thus, the solid bore disc is one piece with no holes and includes a bearing race support for the aft bearing assembly.

The invention claimed is:

1. A turbine rotor disk for an aero gas turbine engine comprising:
    a single piece turbine rotor disk with a plurality of rotor blades extending outward from a rim of the disk;
    a solid axial extension extending out from an aft side of the disk;

a hollow axial extension extending out from a forward side of the disk;

the solid axial extension forming a mounting surface for an aft bearing race of the aero gas turbine engine;

the hollow axial extension having threads to connect a compressor to the turbine rotor disk; and, the turbine rotor disk having no axial holes extending from the aft side to the forward side of the turbine rotor disk.

2. The turbine rotor disk of claim 1, and further comprising:

the turbine rotor disk is a last stage turbine rotor disk.

3. A geared turbofan gas turbine engine comprising:

a fan;

a high spool with a high pressure compressor connected to a high pressure turbine;

a combustor to produce a hot gas stream to drive the high pressure turbine;

a speed reduction gear box connected to drive the fan;

a flexible coupling connected between the gear box and the high spool; and, the high pressure turbine having a last stage turbine rotor disk with rotor blades that form a single piece rotor disk, a solid axial extension on an aft side of the rotor disk, a hollow axial extension on a forward side of the rotor disk, and the last stage turbine rotor disk has no holes extending from the aft side to the forward side of the turbine rotor disk.

4. The geared turbofan gas turbine engine of claim 3, and further comprising:

the solid axial extension forms a support surface for aft bearing race of the gas turbine engine.

5. The geared turbofan gas turbine engine of claim 3, and further comprising:

the hollow axial extension includes threads to connect a high pressure compressor to the turbine rotor disk.

* * * * *